United States Patent [19]

Westbrook

[11] Patent Number: 5,022,703
[45] Date of Patent: Jun. 11, 1991

[54] RETRACTABLE REAR BUMPER

[75] Inventor: James E. Westbrook, Lubbock, Tex.

[73] Assignee: Module Truck Service, Inc., Lubbock, Tex.

[21] Appl. No.: 492,642

[22] Filed: Mar. 13, 1990

[51] Int. Cl.$^5$ .............................................. B60R 19/02
[52] U.S. Cl. ..................... 296/183; 293/118; 414/480; 298/1 R
[58] Field of Search ............ 414/480, 556, 557, 537, 414/538; 298/1 R, 17 R, 23 R; 296/183; 293/118, 119, 103, 121, 122, 132

[56] References Cited

U.S. PATENT DOCUMENTS

| | | | |
|---|---|---|---|
| 3,871,695 | 3/1975 | Koenig | 293/118 |
| 4,026,590 | 5/1977 | Holm | 298/1 R |
| 4,247,138 | 1/1981 | Child | 293/131 X |
| 4,514,002 | 4/1985 | McIntosh | 293/155 X |
| 4,541,661 | 9/1985 | Hawk | 293/132 X |
| 4,632,626 | 12/1986 | O'Shea | 414/480 X |

Primary Examiner—David A. Bucci
Assistant Examiner—Brian Dinicola
Attorney, Agent, or Firm—Wendell Coffee

[57] ABSTRACT

A retractable bumper is mounted to the rear of a cotton module transport. The bumper is attached to elongated shafts which are pivoted in tubes. The tubes are mounted upon a bracket which is hinged below the bed of the transport. Before the bed is tilted to a lower position, the bumper is telescoped forward in the tubes and the tubes tilted so that the bumper is moved against the bottom of the bed.

12 Claims, 2 Drawing Sheets

RETRACTABLE REAR BUMPER

BACKGROUND OF THE INVENTION (1) Field of the Invention

This invention relates to rear bumpers for agricultural vehicles, and more particularly to a retractible rear bumper for a cotton module transport. Applicant submits that a module transport manufacturer is one having ordinary skill in this art.

(2) Description of the Related Art

At the present time, seed cotton is harvested in the field and compacted into ricks or modules. A module is a compacted cohesive mass of about 20,000 pounds of seed cotton immediately after harvesting.

These modules are made in the field where the cotton is harvested. They are moved by cotton module transports or module transports to a cotton gin where the seed cotton is processed by separating the lint from the seed.

The module transport is a motorist vehicle having a tiltable specially constructed bed upon a standard truck frame. The tiltable bed has a series of chains thereon. The chains are driven from the same drive as the rear wheels of the truck so that as the truck bed is backed under the module, the chains operate to pull the module onto the truck bed. The bed of the truck is tiltable so that the chains will run very close to the ground, if not engaging the ground, when picking up the module.

Also, when the module is discharged, the bed is tilted so that the back end of the bed is at ground level or very near ground level. The truck wheels are moved to move the truck forward, and the chains are moved to discharge the module at the same rate the truck is moving forward to discharge the module upon the ground.

Rollers below and near the rear of the bed roll along the ground; and therefore, the chains at the rear of the truck are properly spaced above the ground for proper operation.

The bed is level when transporting the module from the field where it is grown to the cotton gin where it will be processed. Usually, the module transports move along public roads.

As the transport moves from the field to the cotton gin, often it must cross ditches to reach the road. Then, the transport must pass over railroad tracks or the like upon seldom used country roads where there is a considerable hump in the road. The bed extends for a considerable length between the rear end or tail of the bed and the rear wheels. Therefore, when traversing rough terrain and roads, the bed, although level on the truck, will drag or almost drag along the earth during normal transporting of the modules to the gin and also moving empty from the gin to a field to pick up modules. Also, since the chains operate at ground level or sometimes even drag into the ground at the time they are picking up or discharging the cotton, they have no covering or protection around them at the rear. The chains are exposed beneath the bed for three or four feet at the rear of the bed.

SUMMARY OF THE INVENTION (1) Progressive Contribution to the Art

When the module transports are on a public road, it is desirable that there be a rear bumper on the back of the bed. Recent federal regulations require that there must be a rear bumper within 30" of the road and within 24" of the rear of the bed.

As described above in the related art, it is essential for the operation of these vehicles, for the tail or rear end of the bed to be lowered so that it is at ground level. Therefore, a bumper cannot be fixed or rigidly mounted in a permanent position below the rear of the bed.

This invention solves the problem of mounting a rear bumper upon a module transport by having the bumper mounted upon shafts which extends a considerable distance forward of the rear of the bed. The long shafts extend from a pivot to the rear of the bed where the bumper is mounted, the bumper in this case being a horizontal bar extending transversely of the bed. The shafts are pivoted to the bed near the forward portion of the shaft. As the truck might pass over bumps or ditches moving between farm land and cotton gin, if the rear of the truck tends to drag the ground, the bumper may pivot upward. Inasmuch as the chains will not be in motion except when picking up or discharging a module, should the bumper hit the chains, no damage is done.

The long shafts extending to the bumper are telescoped within tubes which are mounted to the pivot to the bottom of the bed. Therefore, when it is necessary to load a module, the shafts are moved forward in the tubes. The relationship between the pivot placement and channels to guide the forward end of the shafts is such that the bumper will move upward as well as forward, so that when the bumper is in the full retracted position, it is forward of the exposed chains at the bottom rear of the bed, and the bumper is also raised to be as near as possible to the bed. The movement of the shafts may be accomplished by many mechanical devices. However, inasmuch as compressed air is normally available upon the truck, it is preferred to use an air cylinder to move it.

(2) Objects of this Invention

An object of this invention is to provide a bumper upon the back of a truck having a tilting bed.

Another object of this invention is to provide a retractible bumper upon the rear of a module transport.

Further objects are to achieve the above with equipment which is sturdy, compact, durable, lightweight, simple, safe, efficient, versatile, ecologically compatible, energy conserving, and reliable, yet inexpensive and easy to manufacture, attach, adjust, operate and maintain.

The specific nature of the invention, as well as other objects, uses, and advantages thereof, will clearly appear from the following description and from the accompanying drawing, the different views of which are not necessarily scale drawings.

Figure 1:
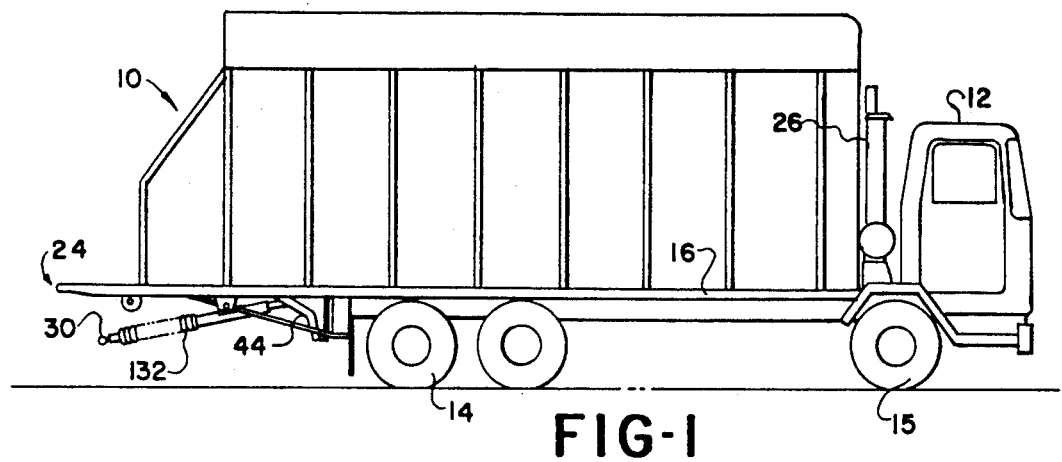
FIG. 1 is a side elevational view of a module transport in the road or level position with the invention according to this application.

As an aid to correlating the terms of the claims to the exemplary drawing, the following catalog of elements is provided:
10 module transport
12 cab
14 rear wheels
15 wheels
16 bed
18 sprockets
20 chains
22 ground roller
24 rear end
26 tilt means
28 guide protectors
30 bumper
32 elongated shafts
34 tubes
36 cross member
38 fluid cylinder
39 cross arm
40 bed bracket
42 guide roller
44 channel
46 pivot
50 tube brackets
52 cushion
54 flange
56 gap
58 spring
60 lights
62 switch
64 cross brace
132 mud guards

DESCRIPTION OF THE PREFERRED EMBODIMENT

The drawings show module transport 10 as a motorized vehicle having cab 12, ground engaging wheels 14 and 15, and bed 16. Sprocket 18 is mounted at the extreme rear end 24 of the bed. Chains 20 extend over the sprocket 18 for the purposes described above. Except at the rear of the bed 16, the chains 20 are guided and protected by guide protectors 28 below the bed.

Roller 22 is mounted underneath the bed 16 near the rear end 24. The module transport 10 includes tilt means 26 for tilting said bed so that the rear end is proximate the ground.

Those having ordinary skill in the art will understand that the structure described to this point is old, well known, and has been commercially on the market for several years.

Figure 2:
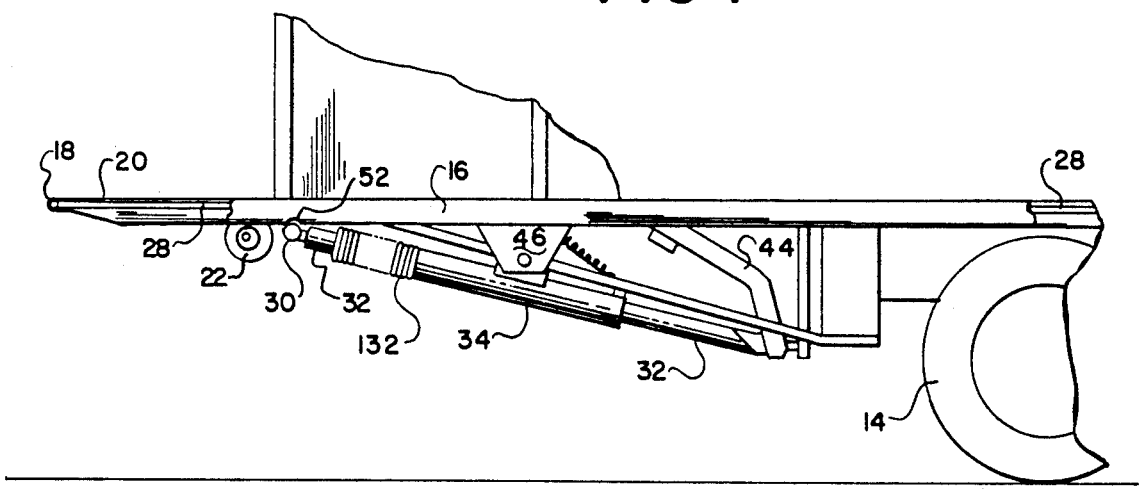
FIG. 2 is a side elevational view of the rear of the bed with the invention according to this application attached and the bumper retracted.
Figure 3:
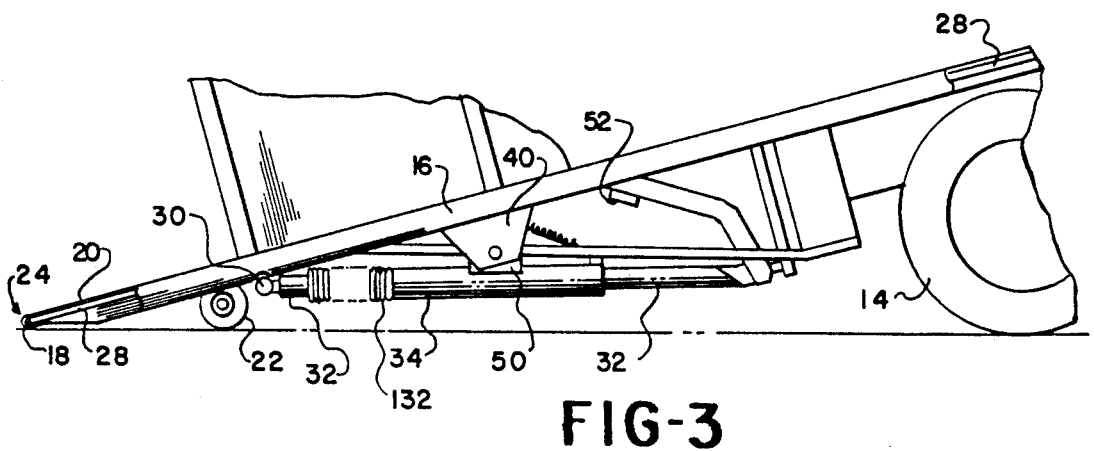
FIG. 3 is a side elevational view similar to FIG. 2 with the bed tilted.
Figure 4:
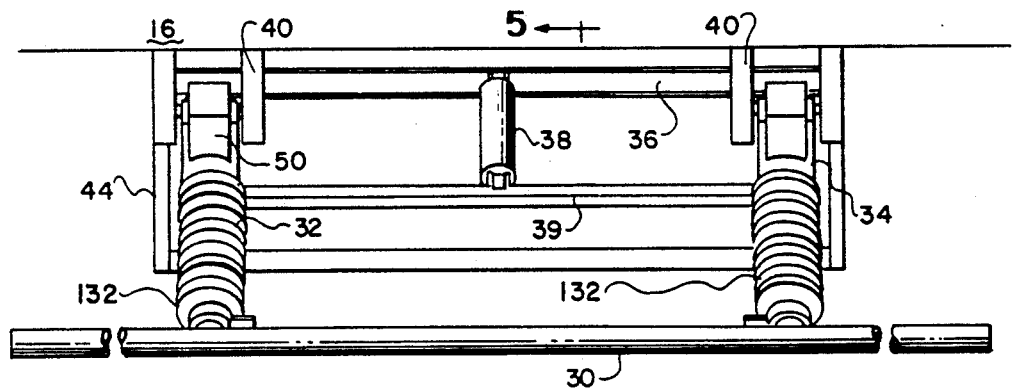
FIG. 4 is a rear elevational view of the invention with the bumper in the extended position.
Figure 5:
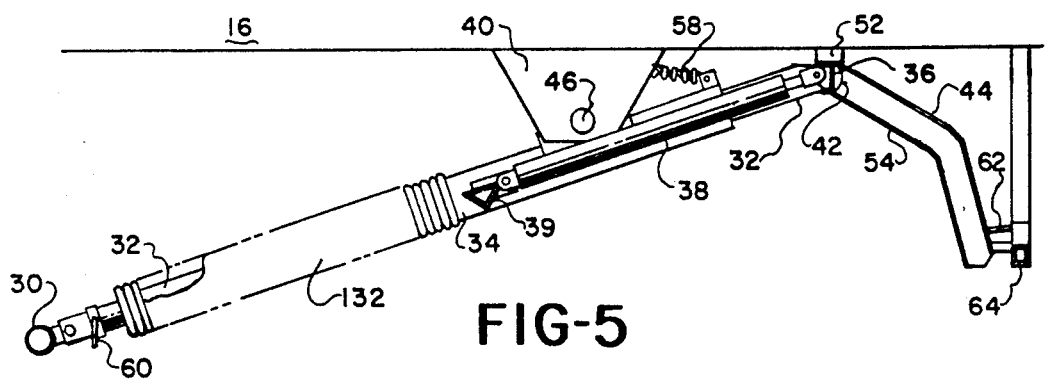
FIG. 5 is a side sectional view taken of the bumper assembly taken substantially on line 5—5 of FIG. 4.
Figure 6:
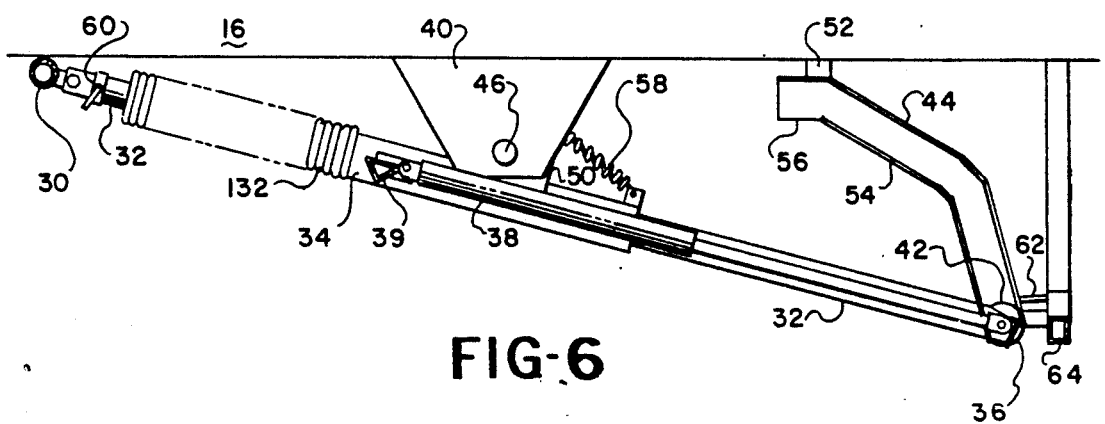
FIG. 6 is a side sectional view similar to FIG. 5 showing the bumper in the retracted position, at a larger scale than FIG. 5.

Bumper 30 is in the form of a horizontal pipe mounted near the rear end 24 of the bed 16. In the road or extended or transport mode of the truck 10, it will be the position seen in FIGS. 1, 4, and 5. In the load and unload or retracted position, it will be forward and against the bottom of the bed, as seen in FIGS. 2, 3, and 6.

Two elongated shafts 32 extending forward from the bumper 30 are telescoped through tubes 34. It will be understood that three or four shafts could be employed and either two or all the shafts could be telescoped through tubes. Also, the shafts could have different cross sectional shapes than the preferred circular shapes; and therefore, circular tubes. If the shafts 32 were of some other shape such as hexagonal or square, the tubes would have a correlative shape. The shafts are mounted for longitudinal movement through the tubes, i.e., they are telescoped through the tubes 34. Since the shafts 32 telescope through the tubes 34 and move through the tubes 34 it is desirable to cover them with a flexible bellows type covering or mud guards 132 as seen in the drawings. The rear bumper 30, instead of being pipe, could be some other structural shape such as a channel or H-beam.

Cross member 36 extends across the forward end of the shafts.

Fluid cylinder 38 extends from cross arm 39 extending between tubes 34 to the cross member 36. As stated above, it is preferred that the fluid be air. However, it will be understood that it could be hydraulic fluid. Also, it will be understood that other extension means for extending and retracting the shafts 32 in the tubes 34 could be used. Stated otherwise, the fluid cylinder 38 is a portion of extension means for extending and retracting the shafts 32 within the tubes 34.

Guide roller 42 is mounted upon each distal end of the cross member 36. The guide rollers fit within channels 44 which are attached to the bottom of the bed 16 to guide the cross member 36; and therefore, the front of the shafts 32. It will be understood that the guide rollers 42 and channels 44 form a portion of guide means for guiding the cross member 36 (and thus, the front of the shafts 32) along a predetermined path.

The tubes 34 are mounted upon pivot 46 which is fixed to the bottom of the bed 16 by bed bracket 40. When the cross member 36 is guided along a predetermined path, the bumper 30 will also follow a predetermined path. The pivot 46 is forward of the rear end 24 and also forward of the ground roller 22. The bed bracket 40 and pivot 46 are to the rear of the rear ground engaging wheels 14 upon the transport 10. The pivot 46 will be horizontal traverse of the vehicle or transport 10. The pivot is parallel to the bumper 30.

Tube brackets 50 connect the tubes 34 to the pivot 46.

As described above, it is desirable that the rear bumper 30 move along a predetermined path. When it is in the rearward most position, it must be within 30" of the ground. When it is in the forward most position, it is desirable that it be as near to the bed 16 as possible. Those having ordinary skill can understand that with a fixed pivot point 46, the guide channel 44 could have many different shapes and locations which would cause the rear bumper to move between these two positions, clearing the rollers 22 as it moved. When the bumper 30 is in the retracted position adjacent to the bed 16, it is necessary that the bumper be located so as not to interfere with the loading operation. So there will be no damage done to the chains 20 while they are in motion, the bumper must not be behind the guide protectors 28 along the bottom of the chains 20. It has been found desirable to place a rubber or other resilient cushion 52 on the bottom of the bed 16 for the cross member 36 to rest against when it is in the extended position.

The channels 44 have bottom flange 54 which is a portion of the guide for the rollers 42. However, when the rollers are in the extreme rear position, i.e., when the bumper 30 is fully extended, the channel 44 is removed, forming a gap 56. Therefore, the rollers 42, and thus, the cross member 36, are free to move downward, and the bumper 30 is free to move upward so that if the bumper hits a hump in the road or the edge of a ditch or the like, the bumper can move upward without damage.

Normally, the bumper is held downward because the rear of the bumper and shaft assembly weighs more than the forward end of the bumper and shaft assembly, and also, tension springs 58 extend between the forward end of the tubes 34 and the bed bracket 40.

I prefer that the shafts 32 be tubular. Tail lights, stop lights, and other lights 60 are placed upon the shafts 32 near the rear bumper 30. The electrical wiring is conveniently place through the hollow shafts from the lights 60 to the cross member 36, and at the cross member, have a flexible electrical connection going from the cross member to the bed of the truck.

Electrical switch 62 is mounted upon cross brace 64 which braces the lower ends of the channel guides 44. The switch arm to contacts the cross member 36 when the cross member is in its lower most position and the bumper is retracted. Therefore, by convenient electrical connections, the switch 62 is connected to a warning light within the cab 12 to warn the operator that the bumper is retracted; and therefore, it is not proper for him to drive on public roads with the bumper in the retracted position. Obviously, the light in the cab indicates to the driver that the bumper is retracted; and therefore, he can tilt the bed and back the transport to load or unload a module.

From the drawings, it will be apparent that the bumpers are not rigidly fixed to the frame or the bed 16 of the transport 10.

Also, it is noted that the bumper is angled downward from the pivot point. Therefore, in the event that an automobile or vehicle strikes the bumper from the rear, the shafts will not telescope within the tubes because of the downward angle. I.e., horizontal force upon the bumper will cause the shafts 32, being tubular, to bend and collapse and absorb the impact of the automobile striking from the rear, but they will not merely telescope within the tubes. It is desired that the bumpers have a certain amount of movement to absorb the impact of a collision from an automobile striking them from the rear rather than being fixed or rigid so that the front of an automobile striking the bumper is required to absorb the entire impact of the collision. However, the bumper is designed with sufficient strength to absorb any reasonable impact before the force of the impact crumples the shafts 32 and the front of the automobile to the point that the windshield of the impacting automobile strikes the rear end 24 of the transport with excessive force.

The embodiment shown and described above is only exemplary. I do not claim to have invented all the parts, elements or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:
1. A motorized vehicle having:
   a. a cab,
   b. ground engaging wheels,
   c. a bed on said vehicle having a rear end, and
   d. means for tilting said bed so that the rear end is proximate the ground,
   e. wherein the improvement comprises:
   f. a horizontal rear bumper behind all of the ground engaging wheels,
   g. at least two shafts of consistent cross-section attached to said bumper,
   h. tubes having a correlative cross-sectional shape as said shafts,
   j. said shafts telescoped within said tubes,
   k. a tube bracket hinged to the bed behind the ground engaging wheels and forward of the bumper,
   l. said tubes mounted upon said tube bracket,
   m. a cross member attached to said shafts forward of said tubes, and
   n. extension means attached to the cross member for sliding the shafts forward in the tubes, thereby moving the bumper forward and upward.
2. The invention as defined in claim 1, wherein
   o. when said bumper is in a rearward operative condition it has:
      i. means for limiting said cross member in its upward movement, thereby limiting the down position of the bumper,
      ii. said bumper limited in its upward movement only by the bed, and
      iii. the cross member unlimited in its downward movement except by the connection to the bumpers so that if the truck traverses rough terrain, the bumper, upon striking obstructions, is free to move upward to the bed.
3. The invention as defined in claim 1, wherein the bumper is biased downward by springs extending between the tubes and a bed bracket attached to the bed.
4. The invention as defined in claim 1, further comprising:
   o. lights on the bumper,
   p. said shafts being hollow, and
   q. electrical wires extending from the lights through the hollow shafts to the cross member.
5. The invention as defined in claim 1,
   o. wherein said extension means includes a fluid cylinder attached to the cross bar.
6. The invention as defined in claim 1, further comprising:
   o. a guide channel mounted on the bed of the truck,
   p. said guide channel on either side of the cross bar,
   q. guide rollers attached to each end of the cross members mounted within said channel,
   r. whereby the guide rollers guide the cross bar in a predetermined path as it moves,
   s. the guide channel having an upper flange and a lower flange,
   t. the lower flange of the cross bar is open, forming a gap beneath the rollers at a position when the bumper is fully extended whereby the cross member may be moved downward and the bumper moved upward when in this position.
7. The invention as defined in claim 6, further comprising:
   u. a spring loaded switch attached to the channels to be activated when the cross member is in its forward most position,
   v. an indicator within said cab, and
   w. electrical connectors connecting said indicator to indicate to a driver that the bumper is in the raised position.
8. The invention as defined in claim 6,
   u. wherein said extension means includes a fluid cylinder attached to the cross bar.

9. The invention as defined in claim 8, wherein the bumper is biased downward by springs extending between the tubes and a bed bracket attached to the bed.

10. The invention as defined in claim 9, further comprising:
   v. lights on the bumper,
   w. said shafts being hollow, and
   x. electrical wires extending from the lights through the hollow shafts to the cross member.

11. A cotton module transport having:
   a. a cab,
   b. ground engaging wheels,
   c. a bed on said vehicle having a rear end,
   d. means for tilting said bed so the rear end is proximate the ground,
   e. a sprocket on the rear end of the bed, and
   f. chains running over the sprocket;
   g. wherein the improvement comprises:
   h. a bed bracket mounted on the bottom of the bed behind all of the ground engaging wheels,
   i. a horizontal pivot, transverse to the bed, mounted on the bed bracket,
   j. a tube bracket pivoted to the bed bracket,
   k. at least two parallel tubes on the tube bracket,
   l. elongated shafts telescoped within said tubes,
   m. said shafts having a correlative cross sectional shape as the tubes,
   n. a horizontal transverse bumper parallel to the pivot connected to the shafts near the rear end of the bed,
   o. a cross member on the shafts forward of the tubes,
   p. a guide roller on each of the distal ends of the cross member,
   q. guide channels attached to the bottom of the bed forward of the tubes,
   r. said guide rollers within said guide channels thereby guiding the movement of the cross member,
   s. a cross bar connected between the tubes, and
   t. a hydraulic fluid cylinder extending between the cross member and the cross bar for sliding the shafts back and forth within the tubes.

12. The invention as defined in claim 11, further comprising:
   u. tension springs extending from the front of the tubes to the bed bracket for biasing the front of the tubes upward and the back of the tubes and bumper downward,
   v. a gap in said guide channels at a rear end thereof whereby the guide rollers can move downward freely at this point, permitting the bumper to move upward,
   w. lights on the shafts near the bumper,
   x. said shafts being hollow,
   y. electrical wires extending from the lights through the hollow shafts to the cross member,
   z. a spring loaded switch attached to the guide channels to be activated when the cross member is in the forward most position,
   aa. an indicator within said cab, and
   bb. electrical connections connecting the switch to said indicator to indicate to a driver that the bumper is in the raised position.

* * * * *